United States Patent
Lee et al.

(10) Patent No.: US 12,107,440 B2
(45) Date of Patent: Oct. 1, 2024

(54) MONITOR SYSTEM AND POWER SUPPLY CONTROL METHOD

(71) Applicant: Coretronic Intelligent Robotics Corporation, Hsin-Chu (TW)

(72) Inventors: Cheng-Shen Lee, Hsin-Chu (TW); Chih-Neng Tseng, Hsin-Chu (TW); Kuan-Chou Ko, Hsin-Chu (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 687 days.

(21) Appl. No.: 17/113,110

(22) Filed: Dec. 7, 2020

(65) Prior Publication Data

US 2021/0175755 A1    Jun. 10, 2021

(30) Foreign Application Priority Data

Dec. 10, 2019    (CN) .......................... 201911256258.7

(51) Int. Cl.
*H02J 50/60* (2016.01)
*B60L 50/60* (2019.01)
(Continued)

(52) U.S. Cl.
CPC .............. *H02J 50/60* (2016.02); *B60L 50/60* (2019.02); *B60L 53/16* (2019.02); *B60L 53/37* (2019.02);
(Continued)

(58) Field of Classification Search
CPC ................................. H02J 50/60; B60L 50/60
(Continued)

(56) References Cited

U.S. PATENT DOCUMENTS 10,439,550 B1    10/2019    Goodman
10,462,366 B1    10/2019    Bart et al.
(Continued)

FOREIGN PATENT DOCUMENTS

CN    103368278    10/2013
CN    105235545    1/2016
(Continued)

OTHER PUBLICATIONS

"Office Action of Taiwan Related Application, application No. 108145007", issued on Jul. 28, 2021, p. 1-p. 8.
(Continued)

*Primary Examiner* — Bryce M Aisaka
(74) *Attorney, Agent, or Firm* — JCIPRNET

(57) ABSTRACT

Embodiments of the invention provide a power supply control method and a monitor system capable of executing the power supply control method. The monitor system includes a base station, an image capture apparatus, and a processor. The base station includes a charging apparatus including a power supply connector and a power source coupled to the power supply connector and outputting power through the power supply connector. The image capture apparatus shoots the power supply connector to obtain a shot image. The processor determines a foreign object distribution on the power supply connector according to the shot image and sends a warning message according to the foreign object distribution. The foreign object distribution relates to foreign objects formed on the power supply connector. Accordingly, whether a charging mechanism fails can be automatically determined and notification and/or compensation may be performed when the charging mechanism fails.

24 Claims, 7 Drawing Sheets

```
Shoot a power supply connector of a base station    S510
to obtain a shot image
              ↓
Determine a foreign object distribution on the
power supply connector according to the shot       S530
image
              ↓
Send a warning message according to the foreign    S550
object distribution
```

(51) Int. Cl.

| | |
|---|---|
| *B60L 53/16* | (2019.01) |
| *B60L 53/37* | (2019.01) |
| *B60L 53/62* | (2019.01) |
| *B60L 58/10* | (2019.01) |
| *B64D 27/24* | (2006.01) |
| *B64F 1/36* | (2017.01) |
| *B64U 50/37* | (2023.01) |
| *G06T 7/00* | (2017.01) |
| *G08B 21/18* | (2006.01) |
| *H04N 23/80* | (2023.01) |
| *B64U 10/14* | (2023.01) |
| *B64U 101/30* | (2023.01) |
| *H02J 7/02* | (2016.01) |

(52) U.S. Cl.
CPC ........... *B60L 53/62* (2019.02); *B60L 58/10* (2019.02); *B64D 27/24* (2013.01); *B64F 1/362* (2013.01); *B64U 50/37* (2023.01); *G06T 7/0002* (2013.01); *G08B 21/182* (2013.01); *H04N 23/80* (2023.01); *B60L 2200/10* (2013.01); *B64U 10/14* (2023.01); *B64U 2101/30* (2023.01); *G06T 2207/10032* (2013.01); *G06T 2207/30232* (2013.01); *H02J 7/02* (2013.01); *Y02E 60/10* (2013.01)

(58) Field of Classification Search
USPC ......................................................... 320/137
See application file for complete search history.

(56) References Cited

U.S. PATENT DOCUMENTS

| | | | |
|---|---|---|---|
| 2012/0091993 A1 | 4/2012 | Uramoto et al. | |
| 2012/0242285 A1 | 9/2012 | Jung et al. | |
| 2015/0280790 A1* | 10/2015 | Onizuka | H02J 50/12 |
| | | | 320/108 |
| 2017/0057365 A1 | 3/2017 | Cho et al. | |
| 2017/0136904 A1* | 5/2017 | Ricci | B60L 53/38 |
| 2017/0146344 A1 | 5/2017 | Clark | |
| 2017/0244270 A1 | 8/2017 | Waters | |
| 2018/0072170 A1 | 3/2018 | Evans | |
| 2018/0257502 A1 | 9/2018 | Park | |
| 2020/0353826 A1* | 11/2020 | Yaldo | B60L 53/66 |

FOREIGN PATENT DOCUMENTS

| | | |
|---|---|---|
| CN | 106130104 | 11/2016 |
| CN | 107351719 | 11/2017 |
| CN | 207029561 | 2/2018 |
| CN | 105322464 | 6/2018 |
| CN | 108502201 | 9/2018 |
| CN | 105763230 | 11/2018 |
| CN | 108945506 | 12/2018 |
| CN | 109565180 | 4/2019 |
| CN | 110073573 | 7/2019 |
| CN | 110196453 | 9/2019 |
| CN | 209356927 | 9/2019 |
| CN | 209479989 | 10/2019 |
| CN | 108466567 | 11/2019 |
| CN | 110406398 | 11/2019 |
| CN | 209617529 | 11/2019 |
| IN | 108698709 | 10/2018 |
| WO | 2019125596 | 6/2019 |
| WO | 2019179126 | 9/2019 |
| WO | 2019216975 | 11/2019 |

OTHER PUBLICATIONS

"Office Action of US Related Application, U.S. Appl. No. 16/736,799", issued on Sep. 30, 2021, p. 1-p. 18.

"Office Action of Taiwan Related Application No. 108145007", issued on Nov. 30, 2021, pp. 1-8.

Jung-Ju Hsu et al., "Lithium Battery Charger", 2017 Student's Practical Project Report, Department of Electronic Engineering, NCUT, Jun. 2017, Submit with English translation thereof, pp. 1-10.

"Office Action of Taiwan Counterpart Application", issued on Dec. 16, 2020, p. 1-p. 8.

"Office Action of China Counterpart Application", issued on Mar. 25, 2024, p. 1-p. 13.

* cited by examiner

MONITOR SYSTEM AND POWER SUPPLY CONTROL METHOD

CROSS-REFERENCE TO RELATED APPLICATION

This application claims the priority benefit of China application serial no. 201911256258.7, filed on Dec. 10, 2019. The entirety of the above-mentioned patent application is hereby incorporated by reference herein and made a part of this specification.

BACKGROUND OF THE INVENTION

1. Field of the Invention

The invention relates to a monitor technique for a drone, and particularly relates to a monitor system and a power supply control method for a drone.

2. Description of Related Art

In various industries, monitor techniques are used to monitor equipment, buildings, or other assets. Research institutions may monitor animals or ecosystems under watch. In addition, government institutions may monitor roads, parks, or entrances/exits. To rule out human factors, automatic monitoring has been applied nowadays. Automatic monitoring equipment is installed at a specific location to monitor the surroundings. Automatic monitoring equipment may include drones and charging equipment. However, since charging equipment is commonly installed outdoor, and the charging plates thereof are usually metallic, the charging plates may be humidified or rusted due to weather factors, or foreign objects may fall onto the charging plates. All these situations may affect charging efficiency and result in unexpected power consumption and temperature rising. Besides, drones may be insufficiently charged, or are unable to be fully charged within a fixed time period, which results in extra charging time and consequently affects the frequency and efficiency for executing assignments.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a monitor system and a charging control method, which detect an abnormal condition and report the abnormal condition or compensate for a power supply loss resulting from the abnormal condition.

In order to achieve one or a portion of or all of the objects or other objects, an embodiment of the invention provides a monitor system including a base station, an image capture apparatus, and a processor. The base station includes a charging apparatus including a power supply connector and a power source coupled to and outputting power through the power supply connector. The image capture apparatus shoots the power supply connector to obtain a shot image. The processor determines a foreign object distribution on the power supply connector according to the shot image and sends a warning message according to the foreign object distribution. The foreign object distribution relates to foreign objects formed on the power supply connector.

In order to achieve one or a portion of or all of the objects or other objects, an embodiment of the invention provides a power supply method including: shooting a power supply connector of a base station to obtain a shot image, wherein the base station is configured to charge a drone; determining a foreign object distribution on the power supply connector according to the shot image; and sending a warning message according to the foreign object distribution, wherein the foreign object distribution is related to a foreign object formed on the power supply connector.

Based on the above, in the monitor system and the power supply control method according to the embodiments of the invention, whether power supply of the power supply connector at the base station is affected by a foreign object or other abnormal conditions is determined through image identification, and the timing of the charging mode or the magnitude of the power supply voltage is adjusted accordingly, so as to compensate for the power supply loss resulting from the abnormal condition. Accordingly, the charging efficiency is facilitated, and the chance of fully charging the drone becomes higher.

In order to make the aforementioned and other features and advantages of the invention comprehensible, several exemplary embodiments accompanied with figures are described in detail below.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Unless limited otherwise, the terms "connected," "coupled," and "mounted" and variations thereof herein are used broadly and encompass direct and indirect connections, couplings, and mountings. Besides, the terminology "signal" may refer to as at least one current, voltage, charge, temperature, data, electromagnetic wave, or any other one or more signal.

Figure 1:
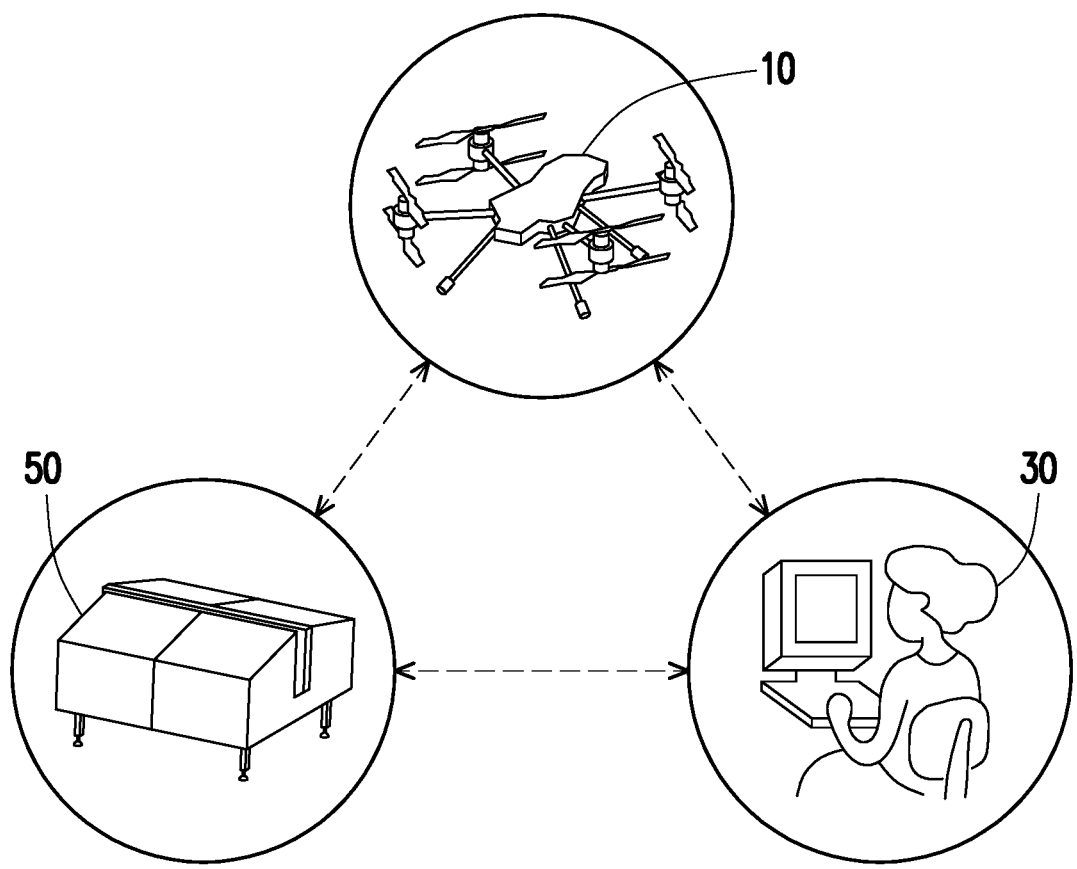
FIG. 1 is a schematic diagram illustrating a monitor system according to an embodiment of the invention.

FIG. 1 is a schematic diagram illustrating a monitor system 1 according to an embodiment of the invention. Referring to FIG. 1, the monitor system 1 includes, but is not limited to, a drone 10, a monitor server 30, and a base station 50.

Figure 2:
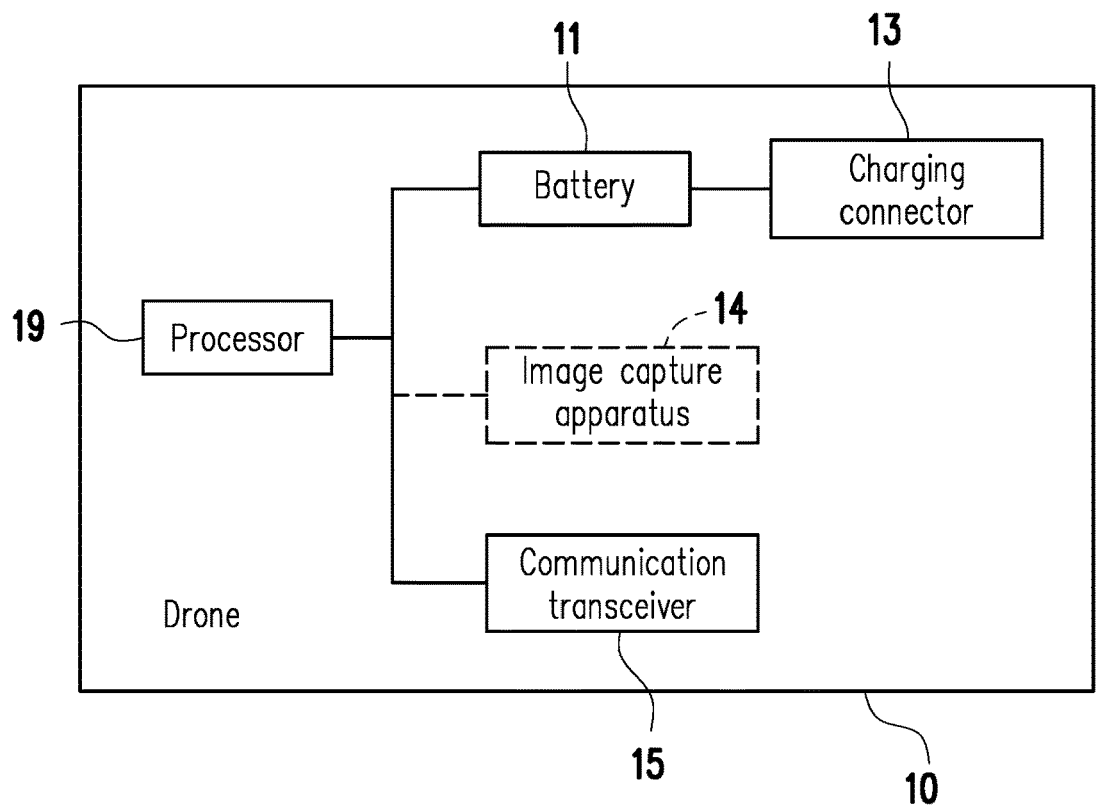
FIG. 2 is a block diagram illustrating a drone according to an embodiment of the invention.

FIG. 2 is a block diagram illustrating the drone 10 according to an embodiment of the invention. Referring to FIG. 2, the drone 10 includes, but is not limited to, a battery 11, a charging connector 13, a communication transceiver 15, and a processor 19.

The battery 11 may be a lithium battery, a fuel battery, a nickel-cadmium battery, a nickel-hydrogen battery, or other rechargeable batteries.

The charging connector 13 may be various connectors such as a terminal, a socket, a port, a pin, a plug, etc. The charging connector 13 is connected with the battery 11 and is configured to be connected with an external power source (e.g., an electric power grid, a power converter, or other power supply apparatuses) to charge the battery 11.

The communication transceiver 15 may be a transceiver compatible with a wireless communication technology, such as Wi-Fi, Bluetooth, fourth generation (4G) mobile communication technology, or mobile communication technologies of other generations.

The processor 19 is coupled to the battery 11 and the communication transceiver 15, and may be a central processing unit (CPU), a micro-controller, a chip programmable controller, an application-specific integrated circuit (ASIC), a field programmable gate array (FPGA), other similar components, or a combination thereof. In the embodiment, the processor 19 is configured to control all the operations of the drone 10.

In an embodiment, the drone 10 further includes an image capture apparatus 14. The image capture apparatus 14 is coupled to the processor 19. The image capture apparatus 14 may be an apparatus such as a camera, a video camera, etc., and may include a component such as an image sensor (e.g., a charge coupled device (CCD), a complementary metal-oxide-semiconductor (CMOS), etc.), an optical lens, an image control circuit, etc. In the embodiment of the invention, the image capture apparatus 14 is configured to shoot toward the external environment. For example, the image capture apparatus 14 shoots toward a location extending outward from the charging connector 13.

Figure 3:
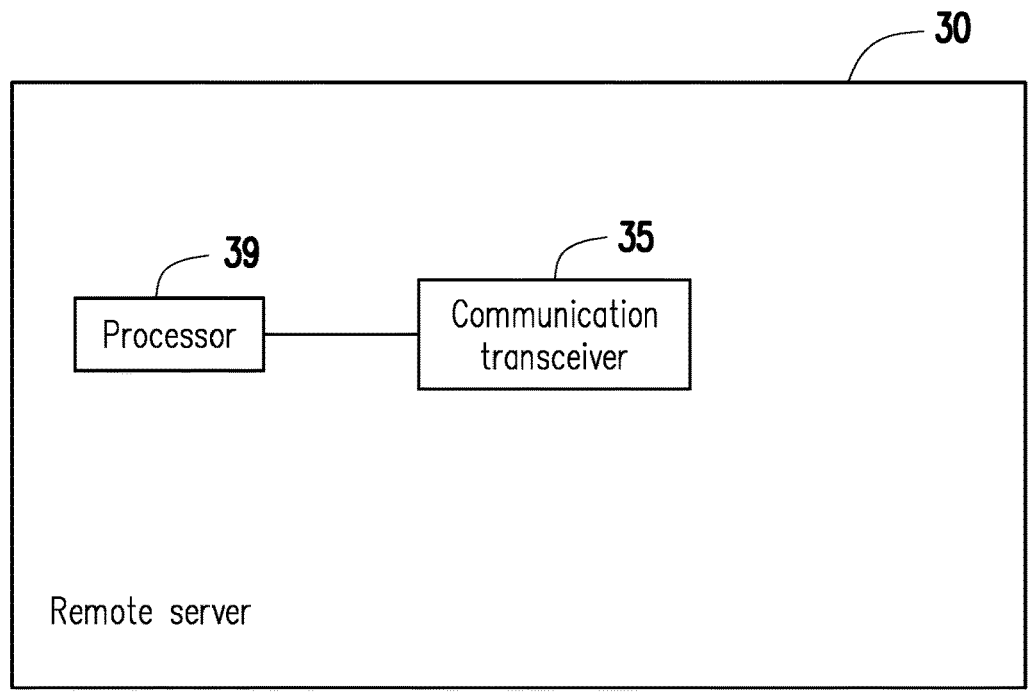
FIG. 3 is a block diagram illustrating a remote server according to an embodiment of the invention.

FIG. 3 is a block diagram illustrating a remote server 30 according to an embodiment of the invention. Referring to FIG. 3, the remote server 30 includes, but is not limited to, a communication transceiver 35 and a processor 39. The remote server 30 may be an electronic apparatus such as a desktop computer, a notebook computer, servers of various types, a smart phone, a tablet computer, etc.

Reference for details of implementing the communication transceiver 35 is directed to the description about the communication transceiver 15 and relevant details will not be repeated in the following. In some embodiment, the communication transceiver 35 may also be compatible with the Ethernet, an optic fiber network, or other types of wired communication networks. The communication transceiver 35 may directly communicate with the communication transceiver 15 or forward information of the communication transceiver 15 via another relay apparatus (e.g., the base station 50, another base station, or a router, etc.).

The processor 39 is coupled to the communication transceiver 35. Reference for details of implementing the processor 39 is directed to the description about the processor 19 and relevant details will not be repeated in the following. In the embodiment, the processor 39 is configured to control all the operations of the remote server 30.

Figure 4:
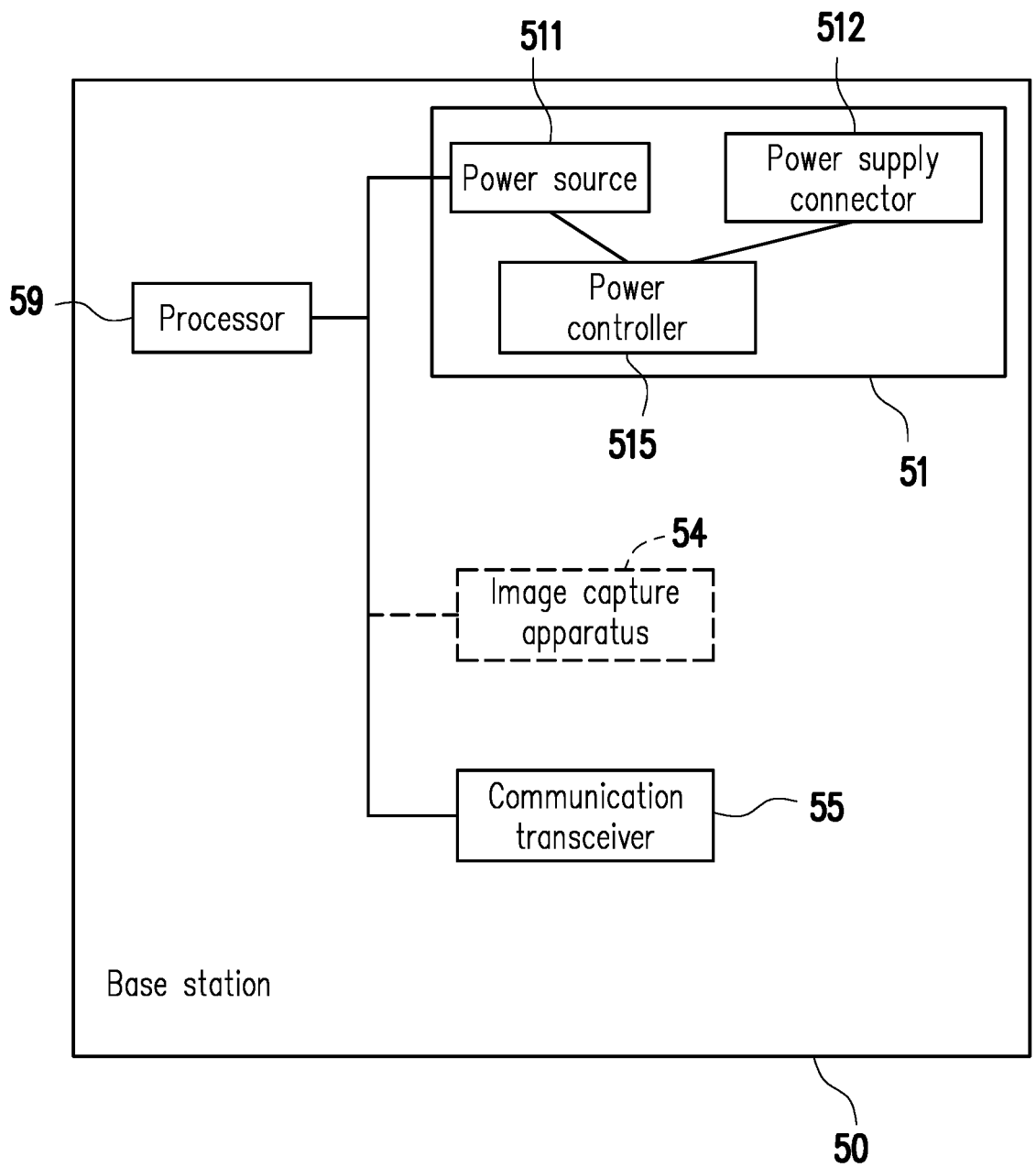
FIG. 4 is a block diagram illustrating a base station according to an embodiment of the invention.

FIG. 4 is a block diagram illustrating the base station 50 according to an embodiment of the invention. Referring to FIG. 4, the base station 50 includes, but is not limited to, a charging apparatus 51, a communication transceiver 55, and a processor 59.

The charging apparatus 51 includes, but is not limited to, a power source 511, a power supply connector 512, and a power controller 515. The power source 511 may be an electric power grid, a generator, a solar energy system, a battery identical to or similar with the battery 11, or a combination of two or more of the aforementioned. The power supply connector 512 may be various connectors such as a terminal, a socket, a port, a pin, a plug, a charging board, etc., and may be connected with the charging connector 13 of the drone 10, and is electrically connected with the power source 511. The power controller 515 may be a processor, a chip, or a circuit, and the power controller 515 is connected with the power source 511 and the power supply connector 512, so that the power source 511 supplies power to a connected external apparatus (e.g., the drone 10 or other electronic apparatuses) through the power supply connector 512.

Reference for details of implementing the communication transceiver 55 is directed to the description about the communication transceiver 35 and relevant details will not be repeated in the following. The communication transceiver 55 may directly communicate with the communication transceiver 15 and/or the communication transceiver 35 or forward information of the communication transceiver 15, 35 via another relay apparatus (e.g., a base station, or a router, etc.).

The processor 59 is coupled to the charging apparatus 51 and the communication transceiver 55. Reference for details of implementing the processor 59 is directed to the description about the processor 19 and relevant details will not be repeated in the following. In the embodiment, the processor 59 is configured to control all the operations of the base station 50.

In an embodiment, the base station 50 further includes an image capture apparatus 54. Reference for details of implementing the image capture apparatus 54 is directed to the description about the image capture apparatus 14 and relevant details will not be repeated in the following. In the embodiment of the invention, the image capture apparatus 54 is configured to shoot the power supply connector 512.

To make the operation procedures of the embodiments of the invention more understandable, several embodiments will be described in the following to explicate the operation flow of the monitor system 1 according to the embodiments of the invention. In the following, the method according to the embodiments of the invention is described with reference to the respective apparatuses in the monitor system 1 and the components or modules therein. The respective steps in the method may be adjusted based on the actual situation, and shall not be limited to those described herein. Besides, for the ease of description, the processor 59 of the base station 50 will be described as an example in the following and serve as the main operating component. However, some operations at the processor 59 may also be executed by the processor 19 of the drone 10 or the processor 39 of the remote server 30, and relevant signals or data may be transmitted or received through the communication transceivers 15, 35, and 55.

Figure 5:
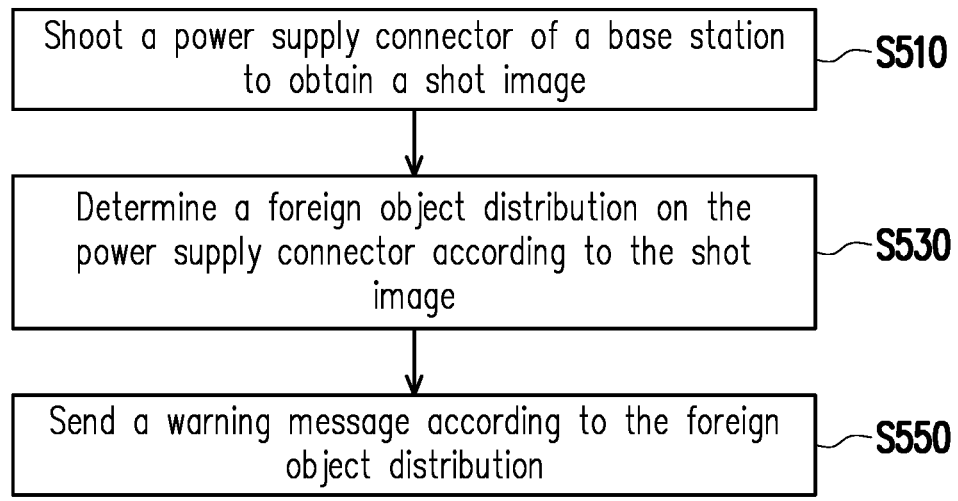
FIG. 5 is a flowchart illustrating a power supply control method according to an embodiment of the invention.

FIG. 5 is a flowchart illustrating a power supply control method according to an embodiment of the invention. Referring to FIG. 5, the processor 59 shoots the power supply connector 512 of the base station 50 by using the image capture apparatus 14 or 54, so as to obtain a shot image (Step S510). In an embodiment, the processor 59 may control the image capture apparatus 14, 54 to shoot at any time, at a predetermined time, or depending on a trigger operation (e.g., a remote control signal, the drone 10 traveling to a location at a predetermined distance, or detecting a specific humidity or wind speed level, etc.). The shot image captured by the image capture apparatus 14, 54 includes the power supply connector 512.

In another embodiment, when the drone 10 travels to a location at a predetermined distance (e.g., 10, 5, or 3 meters) from the base station 50, the processor 19 of the drone 10 may also shoot the power supply connector 512 of the base station 50 by using the image capture apparatus 14 or 54. For example, the distance between the drone 10 and the base station 50 may be detected by using a component such as an infrared sensor, a distance sensor, a radio transceiver, etc.

The processor 59 determines a foreign object distribution on the power supply connector 512 according to the shot image (Step S530). In an embodiment, the foreign object distribution relates to foreign objects formed on the power supply connector 512. The foreign objects may be oxides or hydroxides formed through oxidization (i.e., rusting) of the surface material of the power supply connector 512, leaves, dust, or objects other than the device body of the base station 50. The foreign objects may affect the charging condition. For example, the charging efficiency may decrease, which makes the battery 11 unable to be charged to a certain power capacity level or results in rising of temperature, etc. In the embodiment of the invention, the foreign objects and the distribution thereof are detected by automated optical inspection (AOI) or other image identification technologies.

Figure 6:
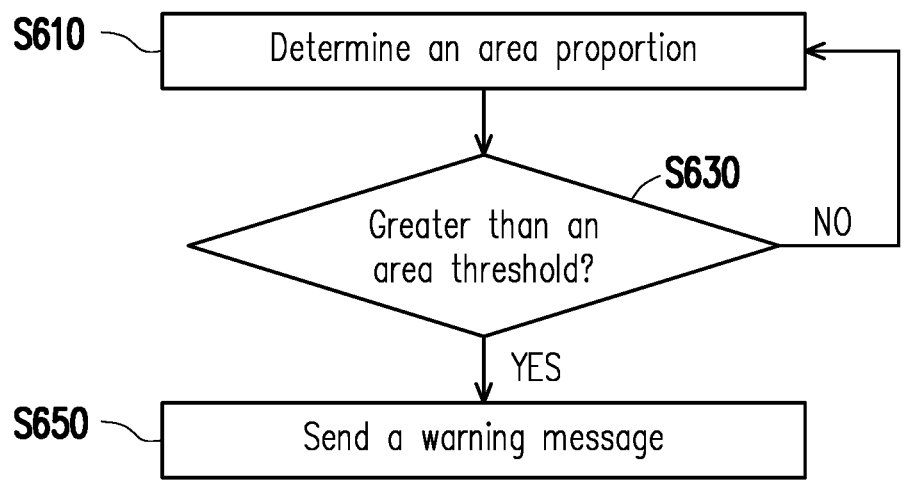
FIG. 6 is a flowchart illustrating foreign object identification according to an embodiment of the invention.

FIG. 6 is a flowchart illustrating foreign object identification according to an embodiment of the invention. Referring to FIG. 6, the processor 59 performs a gray-scale process on the shot image and determines a foreign object area of the foreign object according to a corresponding gray-scale value of the power supply connector 512 in the shot image having been subjected to the gray-scale process (Step S610). Specifically, it is assumed that the brightness of the foreign object is different from that of the power supply connector 512, and a gray-scale image can reflect difference in brightness. The processor 59 may record the corresponding gray-scale value of the power supply connector 512 in advance, sets a gray-scale tolerance range according to the gray-scale value, and sets an object corresponding to a gray-scale value out of the gray-scale tolerance range in the shot image as a foreign object. The processor 59 may further mark the location and the range identified as a foreign object in the gray-scale shot image. The total of the corresponding ranges of the foreign objects is considered as the foreign object area, and the proportion taken up by the foreign object area in the shot image may be set as an area proportion.

It should be noted that, in addition to identifying an object based on gray-scale difference, there are still various ways for identifying an object. For example, a foreign object may be identified by using a classifier based on machine learning, by image feature comparison, etc. In addition, based on practical needs, the processor 59 may also perform an image process on the shot image, such as denoising, color processing, edge detection, image enhancement, etc. The embodiments of the invention do not intend to impose a limitation on this regard.

Then, the processor 59 determines whether the area proportion is greater than an area threshold (Step S630). The area threshold may be a fixed value (e.g., 10%, 25%, or 30%, etc.) Alternatively, the area threshold may also be dynamically adjusted based on a special weather condition (e.g., raining for multiple days, a predetermined high temperature, a predetermined humidity level, a predetermined wind speed, etc.) or a remote setting (e.g., one from the remote server 30). If the area proportion is greater than the area threshold, the processor 59 determines that the current foreign object distribution has affected the charging condition. If the area proportion is not greater than the area threshold, the processor 59 determines that the current foreign object distribution is still within the tolerance range.

The processor 59 may further send a warning message according to the foreign object distribution (Step S550). In the embodiment of FIG. 6, the processor 59 determines the area proportion taken up by foreign objects of the foreign object distribution with respect to the entirety or a portion of the area of the power supply connector 512. If the area proportion is greater than the area threshold, the processor 59 may send a warning message (Step S650). The processor 59 may further send a warning message in the form of a text message, an e-mail, a push notification, etc., to the remote server 30 or other external apparatuses through the communication transceiver 55, or the processor 59 may send a warning message in the form of sounds, images, or glittering colors through a speaker, a display, or an illumination apparatus.

In another embodiment, the foreign object distribution is related to the location where the charging connector 13 and the power supply connector 512 contact each other. The processor 59 may perform image identification on a specific location or range in the shot image. If the location or range corresponding to the location where the charging connector 13 and the power supply connector 512 contact each other contains a foreign object or the proportion taken up by the foreign object exceeds a threshold, the processor 59 may send a warning message.

It should be noted that, in other embodiments, the processor 19, 39 may receive the shot image taken by the image capture apparatus 14, 54 and further determine the foreign object distribution in the shot image.

After the drone 10 lands on the base station 50, the base station 50 may charge the drone 10. The embodiment of the invention is mainly related to a charging mechanism where the charging terminals (i.e., the charging connector 13 and the power supply connector 512) of the drone 10 and the base station 50 contact each other.

Figure 7:
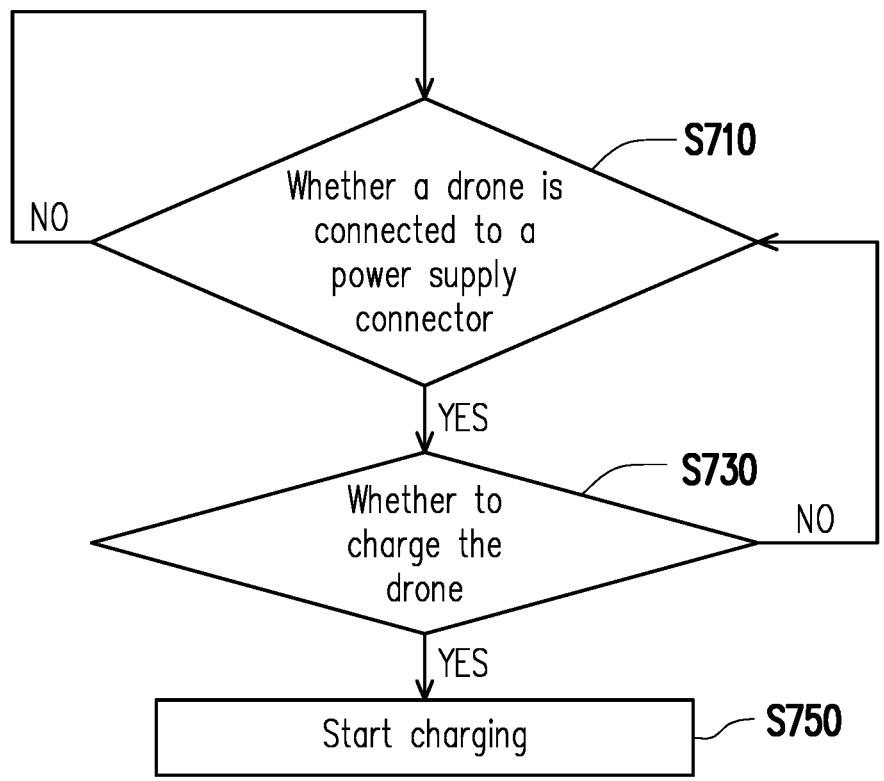
FIG. 7 is a flowchart illustrating connection confirmation according to an embodiment of the invention.

FIG. 7 is a flowchart illustrating connection confirmation according to an embodiment of the invention. Referring to FIG. 7, the processor 59 may determine whether the charging connector 13 of the drone 10 is connected with the power supply connector 512 according to the battery voltage of the battery 11 (Step S710). The power controller 515 includes a detection circuit for the battery voltage. The processor 59 may determine whether the battery voltage of the battery 11 can be measured/read or whether the value thereof falls within a tolerance range (which may relate to the range between the lowest battery voltage and the highest battery voltage of the battery 11, but may be adjustable according to other needs) through the power controller 515, so as to verify a connection state. If the battery voltage can be measured/read or the value thereof falls within the tolerance range, the processor 59 confirms that the charging connector 13 has been connected with the power supply connector 512. For example, the charging connector 13 are two pins extending outward from the main body of the drone 10, and the power supply connector 512 are two charging boards disposed on a platform of the base station 50 and exposed to the external environment. When the pins and the charging boards directly contact each other, the power controller 515 may read the value of the battery voltage. Alternatively, if the battery voltage cannot be measured/read, or the value thereof does not fall within the tolerance range, the processor 59 determines that the charging connector 13 is not connected with the power supply connector 512 and performs Step S710 repetitively at a fixed or arbitrary interval until the charging connector 13 is connected with the power supply connector 512.

If the charging connector 13 is connected with the power supply connector 512, the processor 59 determines whether to charge the power source 511 of the drone 10 through the charging apparatus 51 (Step S730). In an embodiment, the processor 59 may determine whether to charge the battery 11 through the power source 511 according to a battery state of the battery 11. The battery state may be related to the power capacity level of the battery 11, the individual voltages of a plurality of cells in the battery 11, or the voltage differences from one another among the cells. For example, the charging condition may be that the power capacity level of the battery 11 is lower than a charging threshold (e.g., 10%, 20%, or 80% of the power capacity), the voltage of any one or a predetermined number or more of the cells is within a voltage safety range (which may be related to a value between the lowest battery voltage level and the highest battery voltage level of the battery 11, but may be adjusted according to other needs), or the voltage difference from any one of the battery cells or the voltage differences from one another among a predetermined number or more of the cells are within the voltage difference safety range.

It may be set to jointly take all the charging conditions into consideration or to only take some of the charging conditions into consideration. In the case where all the charging conditions are jointly taken into consideration, the processor 59 notifies the charging apparatus 51 to not charge the battery 11 if any of the charging conditions is not met. Specifically, when the power capacity level of the battery 11 is higher than the charging threshold, the processor 59 may consider the battery 11 as not requiring to charge and notifies the charging apparatus 51 to not charge the battery 11. Alternatively if the voltage of a cell is not within the voltage safety range, and/or the voltage difference between cells is not within the voltage difference safety range, the processor 59 may consider the battery 11 as abnormal and notifies the charging apparatus 51 to not charge the battery 11. In some embodiments, when the battery 11 is abnormal (e.g., the case where the voltage of a cell is not within the voltage safety range, and/or the voltage difference between cells is not within the voltage difference safety range), the processor 59 may further send a warning message to the remote server 30 or other external apparatuses through the communication transceiver 55. Reference for details of sending the warning message is directed to the description about sending a warning message due to the foreign object distribution and relevant details will not be repeated in the following.

Meanwhile, if all the charging conditions are jointly taken into consideration, when the charging conditions are all met, e.g., the power capacity level of the battery 11 is lower than the charging threshold, the voltages of the cells are within the battery safety range, and the voltage difference between the cells is within the voltage difference safety range, the processor 59 notifies or controls the charging apparatus 51 to charge the battery 11 (i.e., start charging) (Step S750). For example, the charging apparatus 51 turns on a charging switch. However, it is also possible to consider only some of the charging conditions to determine whether to charge the battery 11 through the power source 511, such as only considering the power capacity level of the battery 11, only considering the voltages of the cells, or only considering the voltage difference between the cells. However, the disclosure is not limited thereto.

It should be noted that, in other embodiments, the processor 19, 39 determines whether the connection state between the charging connector 13 and the power supply connector 512 and the charging condition is met by receiving the reading result of the power controller 515 through the communication transceiver 15, 35. Besides, in some embodiments, it is also possible that the processor 59 directly starts charging when the charging connector 13 is connected with the power supply connector 512.

Then, when the charging connector 13 is connected with the power supply connector 512, the processor 59 determines an abnormal condition at the power supply connector 512 according to an electrical characteristic exhibited during charging the battery 11 by the power source 511. In an embodiment, the abnormal condition relates to the foreign objects formed on the power supply connector 512. The foreign objects may be oxides or hydroxides formed through oxidization (i.e., rusting) of the surface material of the power supply connector 512, leaves, dust, or objects other than the device body of the drone 10. In another embodiment, the abnormal condition relates to damages to the power supply connector 512. Such damage includes, for example, corrosion, breakage, loss, etc., of the power supply connector 512.

The abnormal condition may affect the charging condition. For example, the charging efficiency may decrease, which makes the battery 11 unable to be charged to a certain power capacity level or results in rising of temperature, etc. The charging condition may be represented by the electrical characteristic exhibited during charging the battery 11 by the power source 511. In other words, in addition to determining the foreign object distribution according to image identification, in the embodiments of the invention, the abnormal condition may also be read and determined through the association between the abnormal condition and the electrical characteristic.

Figure 8:
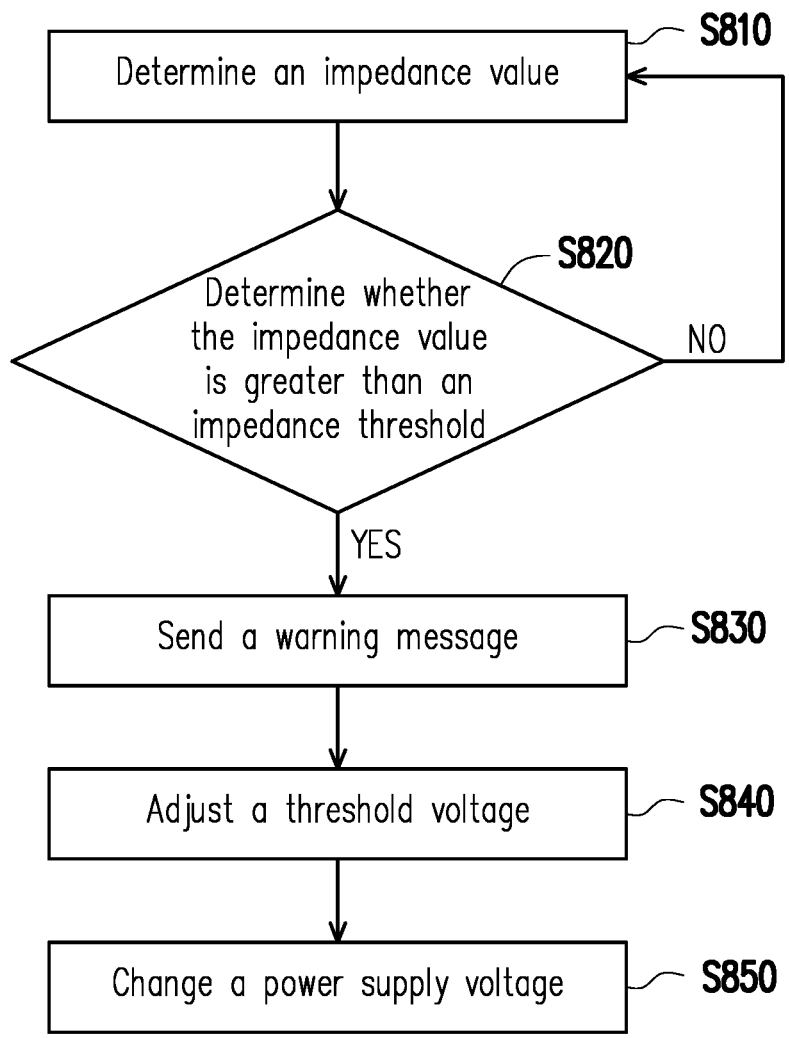
FIG. 8 is a flowchart illustrating power supply compensation according to an embodiment of the invention.

FIG. 8 is a flowchart illustrating power supply compensation according to an embodiment of the invention. Referring to FIG. 8, in an embodiment, the electrical characteristic includes an impedance value. According to findings through experiments and actual situation, the abnormal condition at the power supply connector 512 may result in an increase in the impedance value thereof. The power controller 515 may respectively read the battery voltage of the battery 11, the power supply voltage of the power supply connector 512 (e.g., the voltage of any conductive substance at the power supply connector 512), and the power supply current of the power supply connector 512 (e.g., the current of any conductive substance at the power supply connector 512 or the output current of the power source 511), and the processor 59 determines the impedance value of the power supply connector 512 according to the voltage difference between the battery voltage and the power supply voltage of the power supply connector 512 and the power supply current of the power supply connector 512 (Step S810). The processor 59 may determine whether to send a warning message according to a difference between the impedance value and an impedance threshold. The impedance threshold may be a predetermined value and related to the impedance value measured when the abnormal condition with foreign objects is not present at the power supply connector 512 (but may still be adjusted according to other needs). Since the occurrence of the abnormal condition may result in an increase in impedance value, the processor 59 may determine whether the impedance value is greater than the impedance threshold (i.e., the difference) (Step S820).

If the impedance value is not greater than the impedance threshold, the processor 59 may determine the impedance value of the power supply connector 512 again at the next time when the power supply connector 512 is connected with the charging connector 13 (return to Step S810). Alternatively, if the impedance value is greater than the impedance threshold, the processor 59 determines that the abnormal condition occurs and sends a warning message accordingly (Step S830). Reference for details of sending the warning message is directed to the description about sending a warning message due to the foreign object distribution and relevant details will not be repeated in the following.

It should be noted that, in some embodiments, the processor 59 sets the condition where the impedance value is not equal to the impedance threshold as the condition where the difference thereof does not meet the normal condition. Besides, in other embodiments, the processor 19, 39 determines whether the abnormal condition occurs by receiving the reading result about the impedance value read by the power controller 515 or the processor 59 through the communication transceiver 15, 35.

When the abnormal condition occurs, the base station 50 may initiate a charging compensation mechanism. In an embodiment, the power controller 515 adjusts the power supply setting of the power source 511 (e.g., the output voltage/current of the power source 511, the switching condition of the charging mode of the power source 511, or the choice on the charging mode, etc.) according to the electrical characteristic (e.g., the impedance value of the power supply connector). The power supply setting affects the electrical characteristic. Specifically, due to the increase in impedance value, the power supplied by the power source 511 may be additionally consumed due to the foreign object or other damages. If the current and/or voltage provided by the power source 511 is still maintained at the initial power supply setting (e.g., a default value with no change made to the power supply setting related to the default value), the output power provided to the battery 11 may be insufficient (compared with the output power without the abnormal condition). Comparatively, if the power supply setting of the power source is changed, and the output power provided by the charging apparatus 51 is increased, the power supply loss (e.g., the insufficient output voltage/current of the power source 511, or the insufficient output power, etc.) resulting from the voltage difference between the battery voltage of the battery 11 and the power supply voltage of the power supply connector 512 may be compensated by adopting the adjusted power supply setting.

In an embodiment, the power supply setting includes a switching condition for two charging modes. The two charging modes include a constant current (CC) mode and a constant voltage (CV) mode, and the switching condition includes a threshold voltage. The initial power supply setting of the charging mechanism may be that the power controller 515 is maintained at the CC mode, i.e., the output current of the power source 511 is maintained at a constant value. The output current under the CC mode may be the maximum output current, an output current greater than that under the CV mode, or other values of the power source 511, thereby charging rapidly and consequently reducing charging time. In addition, when the power supply voltage of the power supply connector 512 is greater than the threshold voltage (i.e., the switching condition), the power controller 515 may switch from the CC mode to the CV mode (i.e., the output voltage of the power source 511 is maintained at a constant value). The abnormal condition at the power supply connector 512 may result in an increase in the supply voltage thereof. In addition, compared with the case without the abnormal condition, the power supply voltage at the time when the abnormal condition occurs reaches the threshold voltage sooner, so the charging time under the CC mode is reduced. That is, the time of rapid charging is shortened. Changing the current mode/rapid charging time affects the charging efficiency. The power controller 515 may adjust the threshold voltage according to the voltage difference between the battery voltage and the power supply voltage (Step S840). In an embodiment, the power controller 515 adopts the sum of the voltage difference and the threshold voltage as a new threshold voltage, so that the time maintained under the CC mode increases. For example, the voltage difference is 1V, and the threshold voltage is 24V, then the new threshold voltage is 25V. Compared with the original threshold voltage, it takes a longer time for the supply voltage to reach the new threshold voltage. Accordingly, the charging time under the CC mode is increased. In another embodiment, the power controller 515 may add a predetermined value (which may be related to the proportion of the voltage difference or be a fixed value) to the threshold voltage, so as to obtain the new threshold voltage. For example, the threshold voltage is 30V, then the new threshold voltage is 32V, 35V, or 36V.

It should be noted that, according to different battery properties, the effect of rapid charging may only be exhibited when the CC mode is adopted with the battery capacity level at a specific percentage (e.g., 70% or 80%) or lower. Therefore, the remaining power in the battery 11 may also be taken into consideration in deciding the new threshold voltage.

In another embodiment, the power supply setting includes the output voltage of the power source 511. The power controller 515 may adjust the output voltage according to the voltage difference to change the power supply voltage (Step S750). After the power supply voltage reaches the threshold voltage so the power source 511 switches to the CV mode, the power controller 515 may increase the output voltage of the power source 511 to raise the battery voltage of the battery 11 to an expected voltage level and thereby compensate for power supply loss (e.g., increasing the chance of fully charging the battery 11).

In addition to initiating the compensation mechanism according to the impedance value, in an embodiment, the electrical characteristic includes a voltage difference, and the processor 59 may determine the voltage difference between the battery voltage of the battery 11 and the power supply voltage of the power supply connector 512 and determine whether to send a warning message according to a difference between the voltage difference and a difference threshold. According to findings through experiments and actual situation, the abnormal condition at the power supply connector 512 may result in an increase in the voltage difference between the power supply voltage thereof and the battery voltage. The difference threshold may be a predetermined value and related to the power supply voltage measured when the abnormal condition with foreign objects is not present at the power supply connector 512 (but may still be adjusted according to other needs). Since the occurrence of the abnormal condition may result in an increase in voltage difference, the processor 59 may determine whether the voltage difference is greater than the difference threshold (i.e., the difference).

If the voltage difference is not greater than the difference threshold, the processor 59 may determine the voltage difference again at the next time when the power supply connector 512 is connected with the charging connector 13. Alternatively, if the voltage difference is greater than the difference threshold, the processor 59 determines that the abnormal condition occurs and sends a warning message accordingly. Reference for details of sending the warning message is directed to the description about sending a warning message due to the foreign object distribution and relevant details will not be repeated in the following.

It should be noted that, in other embodiments, the processor 19, 39 determines whether the abnormal condition occurs by receiving the reading result about the voltage difference read by the power controller 515 or the processor 59 through the communication transceiver 15, 35.

Figure 9:
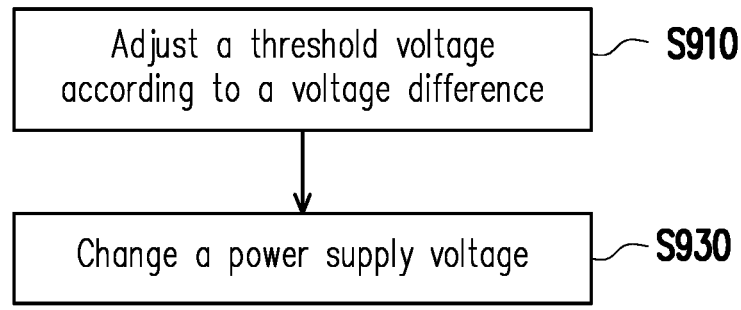
FIG. 9 is a flowchart illustrating power supply compensation according to another embodiment of the invention.

Meanwhile, the power controller 515 may also adjust the power supply setting of the power source 511 according to the voltage difference between the battery voltage and the power supply voltage of the power supply connector 512. In other words, the charging compensation mechanism is initiated. FIG. 9 is a flowchart illustrating power supply compensation according to another embodiment of the invention. Referring to FIG. 9, in an embodiment, the power controller 515 may adjust the threshold voltage according to the voltage difference (Step S910). Reference for details about Step S910 is directed to the descriptions about Step S840 and relevant details will not be repeated in the following. Besides, in another embodiment, the power controller 515 may also adjust the output voltage according to the voltage difference (Step S930). Reference for details about Step S930 is directed to the descriptions about Step S850 and relevant details will not be repeated in the following.

It should be noted that the time points for sending the warning message and adjusting the power supply setting are not limited to the order in the embodiments of FIGS. 8 and 9, and it is also possible that the processor 59 only performs one of sending the warning message and adjusting the power supply setting. Besides, the power supply setting is not limited to the two charging modes, and it is possible that the power controller 515 only adjusts the output voltage and/or the output current.

Figure 10:
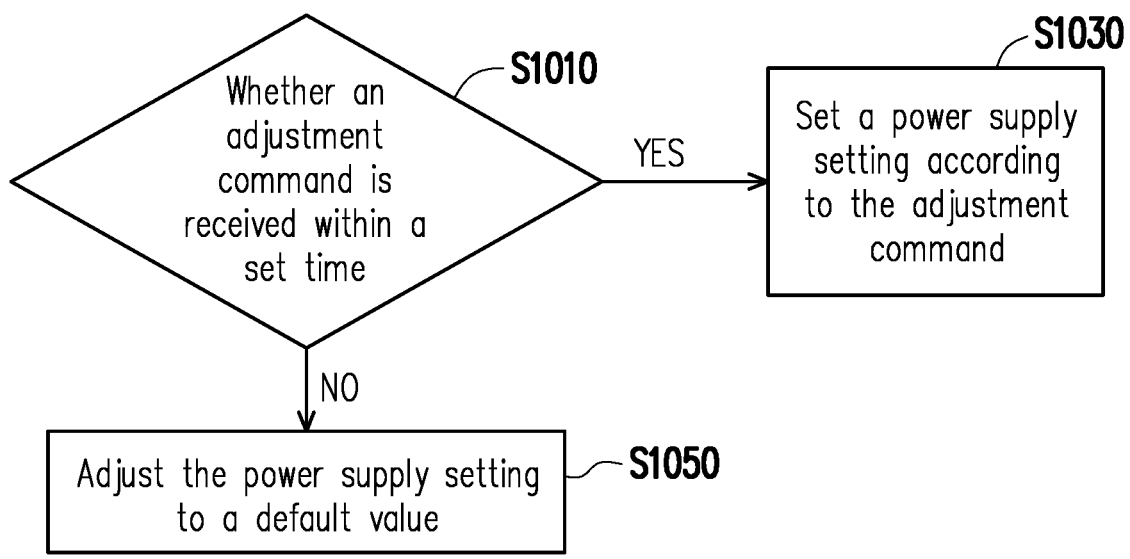
FIG. 10 is a flowchart illustrating power supply setting adjustment according to an embodiment of the invention.

Besides, in the process of executing the charging compensation mechanism, the embodiments of the invention further provide a fool-proof mechanism. FIG. 10 is a flowchart illustrating power supply setting adjustment according to an embodiment of the invention. Referring to FIG. 10, the power controller 515 may determine whether an adjustment command (e.g., changing the threshold voltage, or changing the adjustment command of the output voltage) relating to compensating for the power supply loss within a set time (e.g., 500 ms, one second, or three seconds, etc.) (Step S1010). When the power controller 515 receives the adjustment command from the processor 19, 39, or 59 within the set time, the power controller 515 may set the power supply setting according to the adjustment command setting (Step S1030). For example, the power controller 515 performs Step S740, S750, S810, or S830 to change the threshold voltage or output voltage. Alternatively, when the power controller 515 does not receive the adjustment command within the set time, the power controller 515 may adjust the power supply setting to a default value (Step S1050). The default value is related to the power supply setting remaining unchanged. For example, the power controller 515 does not change the threshold voltage or the output voltage. Accordingly, a communication error which results in an erroneous operation can be avoided.

In view of the foregoing, the monitor system and the power supply control method according to the embodiments of the invention can automatically determine (through image identification and/or electrical characteristic) the abnormal condition at the power supply connector, send a warning message when the abnormal condition occurs, and/or further compensate for the power supply loss. In this way, it is ensured that the drone can be charged normally, which prevents flight safety issues such as power shortage from happening.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A monitor system, comprising a base station, an image capture apparatus, and a processor, wherein:
   the base station comprises a charging apparatus, the charging apparatus comprises a power supply connector and a power source, and the power source is coupled to the power supply connector and outputs power through the power supply connector;
   the image capture apparatus shoots the power supply connector to obtain a shot image; and
   the processor determines a foreign object distribution on the power supply connector according to the shot image, and sends a warning message according to the foreign object distribution, wherein the foreign object distribution is related to at least one foreign object formed on the power supply connector,
   wherein the processor determines an area proportion taken up by the at least one foreign object on the power supply connector, comprising:
   the processor performs a gray-scale process on the shot image and obtains a foreign object area of the at least one foreign object based on a gray-scale value of the at least one foreign object different from a gray-scale value of the power supply connector in the shot image having been subjected to the gray-scale process, so as to determine the foreign object distribution on the power supply connector.

2. The monitor system as claimed in claim 1, wherein the processor determines whether to send the warning message according to a difference between the area proportion and an area threshold.

3. The monitor system as claimed in claim 1, wherein the image capture apparatus is disposed at the base station.

4. The monitor system as claimed in claim 1, further comprising:
   a drone, wherein the image capture apparatus is disposed at the drone.

5. The monitor system as claimed in claim 1, further comprising a drone that comprises a battery and a charging connector, wherein:
   the battery supplies power of the drone, and
   the charging connector is configured to be connected with the battery and connected with the power supply connector; and
   when the charging connector is connected with the power supply connector, the processor determines the foreign object distribution on the power supply connector according to an electrical characteristic exhibited during charging the battery by the power source.

6. The monitor system as claimed in claim 5, wherein the electrical characteristic comprises a voltage difference, and the processor determines the voltage difference between a battery voltage of the battery and a power supply voltage of the power supply connector and determines whether to send the warning message according to a difference between the voltage difference and a difference threshold.

7. The monitor system as claimed in claim 5, wherein the electrical characteristic comprises an impedance value, and the processor determines the impedance value according to a voltage difference as well as a power supply current of the power supply connector and determines whether to send the warning message according to a difference between the impedance value and an impedance threshold.

8. The monitor system as claimed in claim 5, wherein the charging apparatus further comprises:
   a power controller, coupled to the power source and adjusting a power supply setting of the power source according to the electrical characteristic, wherein the power supply setting affects the electrical characteristic, and the power controller compensates for a power supply loss resulting from a voltage difference between a battery voltage of the battery and a power supply voltage of the power supply connector through the adjusted power supply setting.

9. The monitor system as claimed in claim 8, wherein the power supply setting comprises a switching condition of two charging modes, the two charging modes comprise a constant current mode and a constant voltage mode, the switching condition comprises a threshold voltage, and when the power supply voltage is greater than the threshold voltage, the power controller switches from the constant current mode to the constant voltage mode, and the power controller adjusts the threshold voltage according to the voltage difference.

10. The monitor system as claimed in claim 9, wherein the power controller adopts a sum of the voltage difference and the threshold voltage as a new threshold voltage.

11. The monitor system as claimed in claim 8, wherein the power supply setting comprises an output voltage of the power source, and the power controller adjusts the output voltage according to the voltage difference to change the power supply voltage.

12. The monitor system as claimed in claim 11, wherein the power controller increases the output voltage.

13. The monitor system as claimed in claim 8, wherein the power controller determines whether an adjustment command related to compensating for the power supply loss is received within a set time;
   when the power controller does not receive the adjustment command within the set time, the power controller adjusts the power supply setting to a default value, the default value being related to the power supply setting remaining unchanged; and
   when the power controller receives the adjustment command within the set time, the power controller sets the power supply setting according to the adjustment command.

14. A power supply method, comprising:
   shooting a power supply connector of a base station to obtain a shot image, wherein the base station is configured to charge a drone;
   determining a foreign object distribution on the power supply connector according to the shot image, wherein determining the foreign object distribution on the power supply connector according to the shot image comprises:
   determining an area proportion taken up by the at least one foreign object on the power supply connector, comprising:
   performing a gray-scale process on the shot image and obtains a foreign object area of the at least one foreign object based on a gray-scale value of the at least one foreign object different from a gray-scale value of the power supply connector in the shot image having been subjected to the gray-scale process, so as to determine the foreign object distribution on the power supply connector; and
   sending a warning message according to the foreign object distribution, wherein the foreign object distribution is related to at least one foreign object formed on the power supply connector.

15. The power supply control method as claimed in claim 14, wherein sending the warning message according to the foreign object distribution comprises:
   determining whether to send the warning message according to a difference between the area proportion and an area threshold.

16. The power supply control method as claimed in claim 14, wherein before sending the warning message according to the foreign object distribution, the power supply method further comprises:
   determining the foreign object distribution on the power supply connector according to an electrical characteristic exhibited during charging a battery of the drone by a power source when a charging connector of the drone is connected with the power supply connector.

17. The power supply control method as claimed in claim 16, wherein the electrical characteristic comprises a voltage difference, and sending the warning message according to the foreign object distribution comprises:
   determining the voltage difference between a battery voltage of the battery and a power supply voltage of the power supply connector; and
   determining whether to send the warning message according to a difference between the voltage difference and a difference threshold.

18. The power supply control method as claimed in claim 16, wherein the electrical characteristic comprises an impedance value, and sending the warning message according to the foreign object distribution comprises:
   determining the impedance value according to a voltage difference between a battery voltage of the battery and a power supply voltage of the power supply connector and a power supply current of the power supply connector; and
   determining whether to send the warning message according to a difference between the impedance value and an impedance threshold.

19. The power supply control method as claimed in claim 16, wherein after determining the foreign object distribution on the power supply connector, the power supply method further comprises:
   adjusting a power supply setting of the power source according to the electrical characteristic, wherein the power supply setting affects the electrical characteristic, and a power supply loss resulting from a voltage difference between a battery voltage of the battery and a power supply voltage of the power supply connector is compensated for through the adjusted power supply setting.

20. The power supply control method as claimed in claim 19, wherein the power supply setting comprises a switching condition of two charging modes, the two charging modes comprise a constant current mode and a constant voltage mode, the switching condition comprises a threshold voltage, the constant current mode is switched to the constant voltage mode when the power supply voltage is greater than the threshold voltage, and compensating for the power supply loss comprises:
   adjusting the threshold voltage according to the voltage difference.

21. The power supply control method as claimed in claim 20, wherein adjusting the threshold voltage according to the voltage difference comprises:
   adopting a sum of the voltage difference and the threshold voltage as a new threshold voltage.

22. The power supply control method as claimed in claim 19, wherein the power supply setting comprises an output voltage of the power source, and compensating for the power supply loss comprises:
   adjusting the output voltage according to the voltage difference to change the power supply voltage.

23. The power supply control method as claimed in claim 22, wherein adjusting the output voltage according to the voltage difference comprises:
   increasing the output voltage.

24. The power supply control method as claimed in claim 19, wherein compensating for the power supply loss comprises:
   determining whether an adjustment command related to compensating for the power supply loss is received within a set time;
   adjusting the power supply setting to a default value when the adjustment command is not received within the set time, wherein the default value is related to the power supply setting remaining unchanged; and
   setting the power supply setting according to the adjustment command when the adjustment command is received within the set time.

* * * * *